United States Patent
Zuercher et al.

(10) Patent No.: US 6,577,138 B2
(45) Date of Patent: Jun. 10, 2003

(54) APPARATUS FOR DETECTING ARCING AND OVERCURRENTS IN DC ELECTRICAL SYSTEMS SUBJECT TO CYCLIC DISTURBANCES

(75) Inventors: Joseph C. Zuercher, Brookfield, WI (US); Steven Christopher Schmalz, Greenfield, WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/939,220

(22) Filed: Aug. 24, 2001

(65) Prior Publication Data

US 2003/0038640 A1 Feb. 27, 2003

(51) Int. Cl.[7] .............................................. G01R 31/02
(52) U.S. Cl. .......................... 324/536; 324/544; 361/42
(58) Field of Search ..................... 361/42, 102; 702/58; 324/536, 541, 542, 544

(56) References Cited

U.S. PATENT DOCUMENTS

| | | | |
|---|---|---|---|
| 4,376,243 A | 3/1983 | Renn et al. .................. 219/514 |
| 5,187,484 A | * 2/1993 | Stove ......................... 342/200 |
| 5,359,293 A | * 10/1994 | Boksiner et al. ............. 324/536 |
| 5,432,455 A | * 7/1995 | Blades ........................ 324/520 |
| 5,691,869 A | 11/1997 | Engel et al. .................. 361/42 |
| 5,805,398 A | 9/1998 | Rae .............................. 361/42 |
| 5,889,643 A | * 3/1999 | Elms ............................ 361/42 |
| 5,933,305 A | 8/1999 | Schmalz et al. ............... 361/42 |
| 6,002,561 A | * 12/1999 | Dougherty ................... 361/102 |

* cited by examiner

*Primary Examiner*—N. Le
*Assistant Examiner*—Vincent Q. Nguyen
(74) *Attorney, Agent, or Firm*—Roger A. Johnston

(57) ABSTRACT

Arcing in dc electrical systems subject to cyclic disturbances is detected by a current sensor, and a bandpass filter sensitive to arcing noise, which filters the sensor current. The absolute value of the bandpass filtered signal is integrated over repetitive intervals in a resettable analog integrator. A low cost microprocessor samples and resets the analog integrator at a frequency below the pass band and generates a time attenuated accumulation of the samples that produces an arcing signal if it reaches a predetermined limit. To improve nuisance immunity, the sensed dc current is compared in a high speed comparator to the average sensed dc current, and only samples taken by the microprocessor during a predetermined time period after the sensed dc current exceeds the average sensed dc current in a predetermined manner are accumulated. The average sensed dc current is also used by the microprocessor to provide overload protection.

25 Claims, 4 Drawing Sheets

APPARATUS FOR DETECTING ARCING AND OVERCURRENTS IN DC ELECTRICAL SYSTEMS SUBJECT TO CYCLIC DISTURBANCES

BACKGROUND OF THE INVENTION

1. Field of the Invention

This invention relates to apparatus and a method for detecting arcing in dc electrical systems and especially those subject to cyclic disturbances such ac ripple and pulse width modulated loads.

2. Background Information

It is common to provide overload, and sometimes overcurrent, protection in dc electrical systems. Overload protection is typically provided by either a thermal element which emulates the heating of the distribution wiring and opens a contact when the bimetal reaches a certain temperature, or an electronic circuit which simulates the same thermal process. Overcurrent protection is typically provided by an instantaneous trip feature which opens the circuit breaker rapidly if the current exceeds a particular threshold, such as would be reached by a short circuit, and is implemented by a magnetic trip device or an electronic simulation. A fuse is a disposable thermal trip unit with no instantaneous capability.

In addition to overload and short circuit protection, there is developing interest in protection in dc electrical systems against arc faults. Arc faults involve a highly concentrated region of heat production, a type of "hot spot", that can result in insulation breakdown, production of combustion products, and the ejection of hot metal particles. It can also result from broken conductors or poor connections.

Arc faults can be series or parallel. Examples of a series arc are a broken wire where the ends are close enough to cause arcing, or a poor electrical connection. Parallel arcs occur between conductors of different potential including a conductor and ground. Arc faults occur in series with the source and series arcs are further in series with the load. Arc faults have a relatively high impedance. Thus, a series arc results in a reduction in load current and is not detected by the normal overload and overcurrent protection of conventional protection devices. Even the parallel arc, which almost always draws current in excess of normal rated current in a circuit, produces currents which can be sporadic enough to yield RMS values less than that required to produce a thermal trip, or at least delay operation. Effects of the arc voltage and line impedance often prevent the parallel arc from reaching current levels sufficient to actuate the instantaneous trip function.

For many reasons, automotive circuits will be migrating to higher voltages such as 36 or 42 volts which are disproportionately more prone to damage from arcs than the present 14 volt circuits, due principally to the arc voltage being between 12 and 30 volts. Even 28-volt circuits, common in the aerospace industry, have been shown to provide an environment that supports sustained arcing. The single most aggravating factor beyond that found in residential power systems is vibration with significant humidity and dirt sometimes being aggravating factors. In addition, the telecommunications field uses 24 volt (and may migrate to 48 volt) dc systems which are susceptible to arcing. Arcs at these voltages cannot preexist, i.e., must be "drawn" by a contact being separated. If they are initially extinguished to an open circuit, they should not reoccur, in theory. But the presence of carbonization or the introduction of other contaminants dynamically, ionized gas (very short lived) and vibration, which can recontact the surfaces, can make multiple occurrences not uncommon. This is particularly true of a moving vehicle travelling through the elements.

The arcing, and particularly parallel arcing, in dc electrical systems causes noise which can be exploited to detect the phenomena. Unfortunately, there are other sources of noise in the dc systems. For instance, dc power generated by an alternator equipped with a rectifier typically has a ripple content. It is now becoming more common to use pulse width modulation to control loads in dc systems. Pulse width modulation generates steps in current that introduce spurious high frequency signals. In addition, low energy positive and negative spikes of twice nominal voltage (and current) values can be introduced into these dc systems by the turning off of inductive loads. Also, bidirectional currents can be introduced by regenerative breaking, battery charging, and an integrated starter/generator in automotive dc systems.

There is a need, therefore, for an improved apparatus and method for detecting arcing in dc electrical systems.

There is also a need for such apparatus in a method which is immune to nuisance detection in response to other noise that can be present in such dc systems.

There is an additional need for such an apparatus and method which is economical to manufacture and maintain.

SUMMARY OF THE INVENTION

These needs and others are satisfied by the invention which is directed to apparatus for detecting arcing in a dc electrical system having cyclic disturbances and comprises a sensor sensing the current in the dc system and generating a sensed dc current signal, a bandpass filter filtering the sensed dc current signal with a pass band selected for sensitivity to arcing noise in the dc electrical system to generate a filtered current signal, and processing means processing the filtered current signal. The processing means integrates the filtered current signal over repetitive intervals to generate integrated filtered current values. It then generates a time attenuated accumulation of the integrated filtered current values and produces an output signal indicating the presence of arcing when the time attenuated accumulation reaches a predetermined value. In order to be able to implement the invention utilizing an inexpensive digital processor, which has a sampling capability slower than the pass band of the bandpass.filter sensitive to arcing noise, the processing means includes a resettable analog integrator which integrates the absolute value filtered current signal. The inexpensive digital processor then samples the integrated values during each repetitive period and uses the digitized results to calculate the time attenuated accumulation.

In order to further immunize the apparatus from nuisance generation of an arcing signal, only integrated values which are generated during predetermined time periods following instances where the sensed dc current signal exceeds an average value of the sensed dc current signal in a predetermined manner, such as by a selected margin or multiple, are used to generate the time attenuated accumulation. Thus, the processing means can include a comparator which compares the sensed dc current signal to the average sensed dc current signal and enables the microprocessor to accept samples for a predetermined time period which can extend to multiple integration cycles.

As another aspect of the invention, the average sensed dc current signal which can be generated by a low pass filter can also be processed by the microprocessor to provide overload protection.

In accordance with an additional aspect of the invention, the running average of a selected number of the most recent integrated filtered current values before the present value exceeds the average current value in the predetermined manner is subtracted from the present value for use in generating the time attenuated accumulation in order to further desensitize the apparatus to the cyclic disturbances such as those caused by a pulse width modulated load.

Furthermore, the invention embraces a method of detecting arcing in dc electrical systems having cyclic disturbances which includes sensing current in the dc system and generating a sensed dc current signal, bandpass filtering the sensed dc current signal in a pass band selected for sensitivity to arcing noise in the dc electrical system to generate an absolute value current signal, repetitively integrating the absolute value bandpass filtered signal over repetitive periods, generating an average sensed dc current signal, and processing the integrated signal, the sensed dc current signal and the average sensed dc current signal to determine the presence of arcing.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
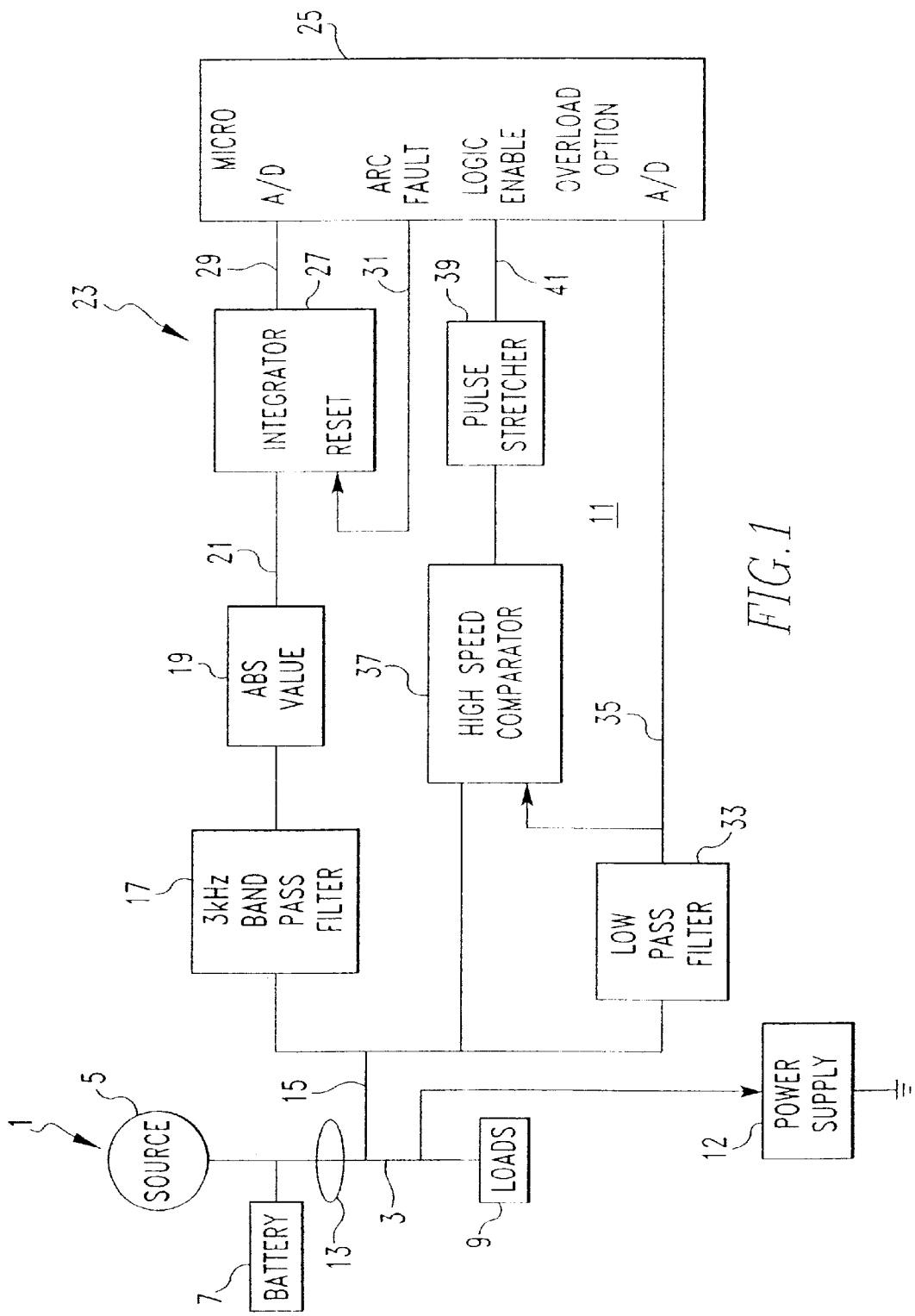
FIG. 1 is a schematic diagram of the apparatus in accordance with the invention.

Referring to FIG. 1, the invention is applied to the detection of arcing, and overloads, in a dc electrical system 1 which includes a dc bus 3 powered by a source 5, which may be, for instance, an alternator incorporating a rectifier. A battery 7 provides alternative power to the dc bus 3 and can be charged by the source 5. Loads 9 are energized by the dc bus 3.

The dc electrical system 1 can be an automotive system, an aerospace system, a telecommunications system, or other dc systems operating at a voltage susceptible to arcing, e.g., about 24 volts and above. The invention is directed to apparatus and a method for detecting parallel arcs in such systems. That is, arcs between conductors or between conductors of different potential or a conductor and ground. Such arcing produces spurious high frequency noise. This activity must be discriminated from other sources of noise in the dc electrical system, much of which tends to be cyclic. For instance, in automobile electrical systems the rectified current generated by the alternator can produce ac ripple in the dc current. In addition, some of the loads are controlled by pulse width modulation, which can produce high frequency noise. Other disturbances that must be discriminated in the system include spikes caused by the turning off of inductive loads.

The arc detection apparatus 11 in accordance with the invention analyzes the high frequency noise associated with arcing in the dc electrical system 1. This apparatus 11 is powered by a power supply 12 energized by the dc bus 3 and includes a sensor 13, such as, for example, a Hall effect or a shunt device, which generates a sensed dc current signal 15. It is advantageous to locate the sensor 13 adjacent the battery 7 to increase sensor sensitivity to high frequency noise due to the lower ac impedance of the battery relative to that of typical loads 9 and the source 5. The sensed dc current signal 15 is applied to a bandpass filter 17 having a pass band sensitive to arcing noise. In the exemplary apparatus the passband has a center frequency of about 3 KHz and a Q of about 5. The output of the bandpass filter 17 is passed through an absolute value circuit 19 to produce an absolute value bandpass filter signal 21. The absolute value circuit 19 permits the apparatus to respond to positive and negative steps in the ac coupled bandpass filtered waveform.

The apparatus 11 further includes processing circuitry 23 for processing the absolute value bandpass filter signal 21 to detect arcing. This process circuitry 23 can be all digital. However, one of the goals of the invention is to provide an inexpensive apparatus. As implemented in the exemplary embodiment, the processing circuitry 23 includes a low-cost microcomputer 25, such as a PIC microcomputer. This microcomputer 25 does not have the capability of digitizing the absolute value bandpass filtered signal at a high enough frequency required to avoid aliasing. Accordingly, the processing circuitry 23 includes a resettable analog integrator 27, which over repetitive sampling intervals integrates the absolute value filtered current signal 21 to generate an integrated filtered current signal 29. This analog integrated filtered current signal 29 is digitized by A/D converter in the microcomputer 25 for analysis by an arc fault routine, described in detail below, but which generates a time attenuated accumulation of the samples of the integrated filtered current signal and produces an output in the form of an arc fault signal when the time attenuated accumulation reaches a predetermined value. The microcomputer 25 resets the analog integrator 27 after each sample is taken by providing a reset signal 31, which is 10 μsec in the exemplary system.

In order to further immunize the apparatus 11 from nuisance activation, the noise must exceed the average value of the dc current in a predetermined manner. Thus, a low pass filter 33, generates an average sensed dc current signal 35 from the sensed dc current signal 15. The sensed dc current signal 15 is then compared with this average sensed dc current signal 35 in a high speed comparator 37. By high speed, it is meant that the comparator must have a response frequency which is at least twice the high end of the frequency response of the bandpass filter 17. In the exemplary apparatus, this is 10 KHz. A pulse stretcher 39 maintains the logic output of the high speed comparator 37 for periods of time which extends over one or more sampling intervals of the microprocessor 25. In the exemplary embodiment of the invention the sampling rate of the microprocessor 25 is 1 KHz and the pulse stretcher extends the logic output of the high speed comparator 37 for about 1–5 milliseconds. This output of the pulse stretcher is an enable signal 41 which is input to the microprocessor 25 and enables the arc fault routine of the microprocessor to only add those samples generated during the duration of the enable signal to the time attenuated accumulation.

The amount by which the sensed dc current signal 15 must exceed the average sensed dc current signal 35 in order for the high speed comparator 37 to generate an enable signal 41 can be based on various criteria. For example, the enable signal 41 can be generated when the sensed dc current is above the worst case sum of pulse width modulated load currents, or, for instance, when the sensed dc current signal is two or three times the average sensed dc current signal value. The latter setting recognizes the fact that parallel arcs sporadically and instantaneously greatly exceed the low frequency load current. The operative point is to set the threshold at a level which minimizes nuisance responses to other noise in the dc electrical system.

Figure 1A:
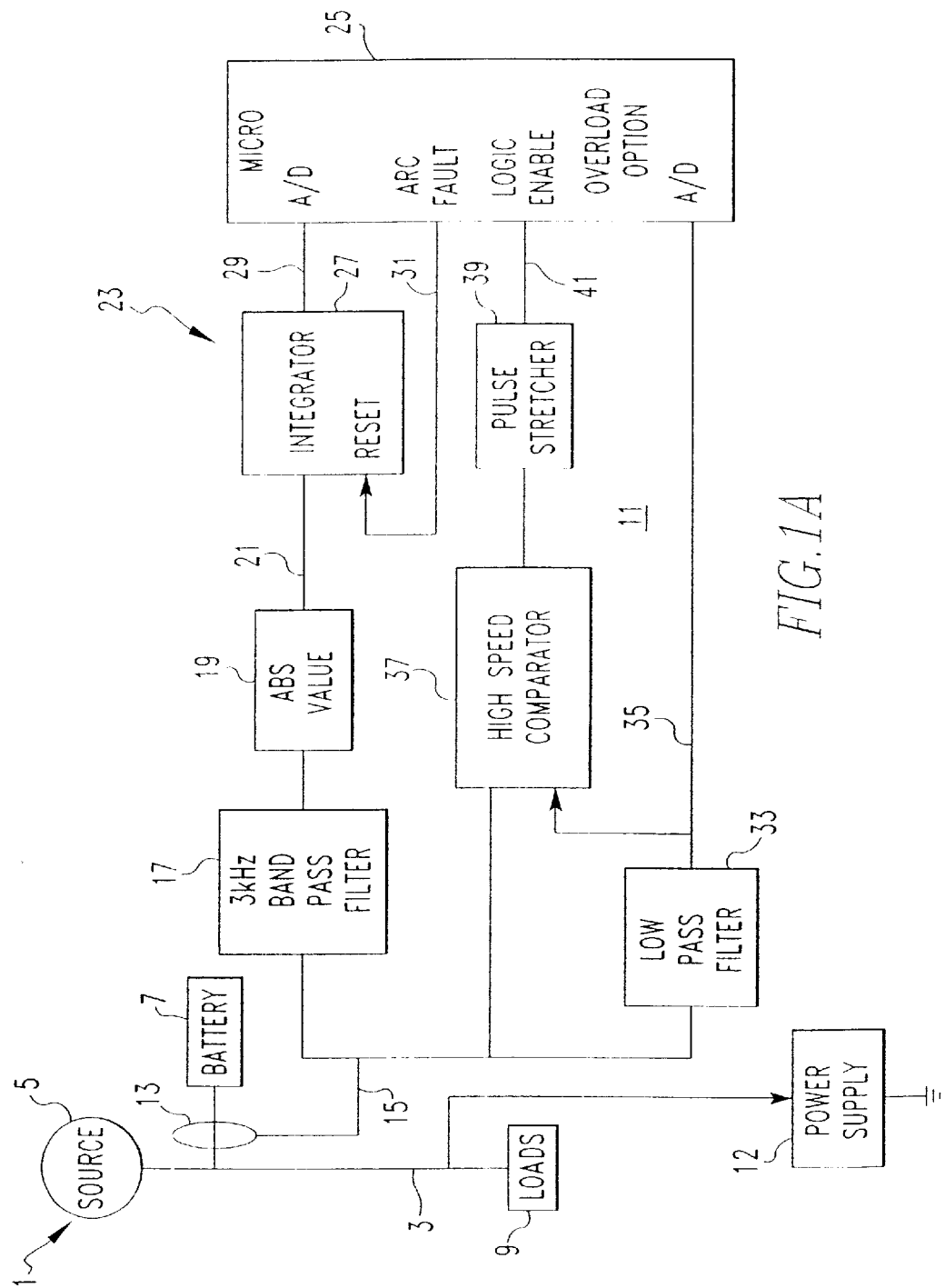
FIG. 1A shows alternative placement of the current sensor in the apparatus of FIG. 1.

FIG. 1A shows a modification to the arrangement shown in FIG. 1 in which the sensor 13 is located in a battery cable 7c rather than on the dc bus 3. While this alternative arrangement will not detect the steady state dc current supplied by the source 5 to the load 9, it will still detect arcing currents and cyclic disturbances, such as pulse width modulation, anywhere in the dc electrical system 1 because of the low ac impedance of the battery. Its particular advantage is that the overload routine run by the microprocessor can be used to provide overload protection for the battery cable, both when the battery is supplying the loads, and also during battery charging and regenerative braking. Such a feature is especially useful where the battery is remotely located, such as in the trunk of a vehicle.

Figure 2:
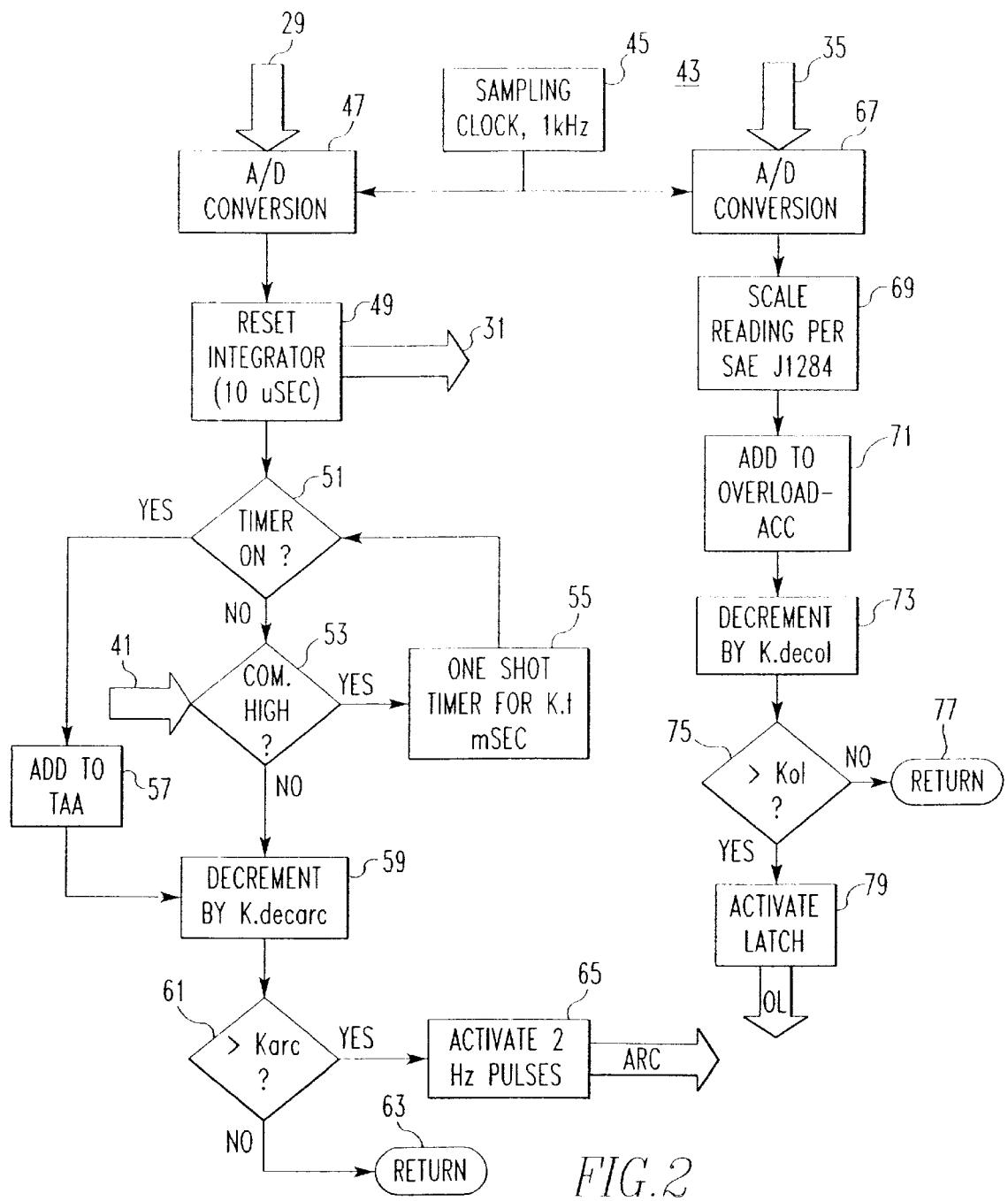
FIG. 2 is a flow diagram of an exemplary routine implemented by a microprocessor which forms part of the apparatus of FIG. 1.

FIG. 2 illustrates the exemplary routine 43 run by the microprocessor 25. The sampling clock 45 establishes the one KHz clock rate which governs the repetitive analog to digital conversion at 47 of the integrated filtered current signal 29 on the analog integrator 27. After each sample is taken, the integrator is reset at 49 by generation of the 10 μsec reset signal 31. As was previously discussed, only the samples taken during a predetermined time period after the sensed dc current exceeds the average sensed dc signal in the prescribed manner are used by the microprocessor in determining the presence of arcing. Thus, the microprocessor implements a timer which is started by the enable signal 41 from the high speed comparator 37. As indicated in FIG. 2, if the timer is not on at 51, but the enable signal 43 is high at 53, then a one shot timer for K.t milliseconds is set at 55 where K is, for instance, from 1 to about 5 milliseconds. If the timer is on at 51, then the sample is added to the time attenuated accumulation (TAA) at 57. The time attenuated accumulation is then decremented by K.decarc at 59. Various functions can be used to decrement the TAA such as a fixed amount per cycle or a percentage of the accumulated value. If the time attenuated accumulation has not reached the limiting value Karc at 61, then the program returns at 63 waiting for the next sample. If however, the limit for the time attenuated accumulation has been reached at 61, an output signal indicating an arc pulse in a form of two Hz pulses is generated at 65. The routine 43 also takes periodic samples at 67 of the average sensed dc current signal 35 at the rate determined by the sampling clock 45. The samples are then scaled in accordance with the overload curve such as that designated by SAE J1284 at 69. The scaled value is then added to the overload accumulator at 71. Next, overload accumulator is time decremented by K.decol at 73 to implement the desired overload response curve. If the accumulated overload value has not reached the overload limit Kol at 75, the routine waits for the next sample at 77. If the overload trip limit is reached at 75, then a latch is activated at 75 to produce an overload trip signal at 79.

In the above described embodiment of the invention, the output of the high speed comparator 37 enables the collection by the microcomputer 25 of the 3 KHz activity from the resettable integrator 27. The purpose of this is to collect information only when the instantaneous current is greater in a predetermined manner than the average current. This prevents the pulse width modulated signals from contributing to the time attenuated accumulation if sufficiently high current spikes are not present.

Figure 3:
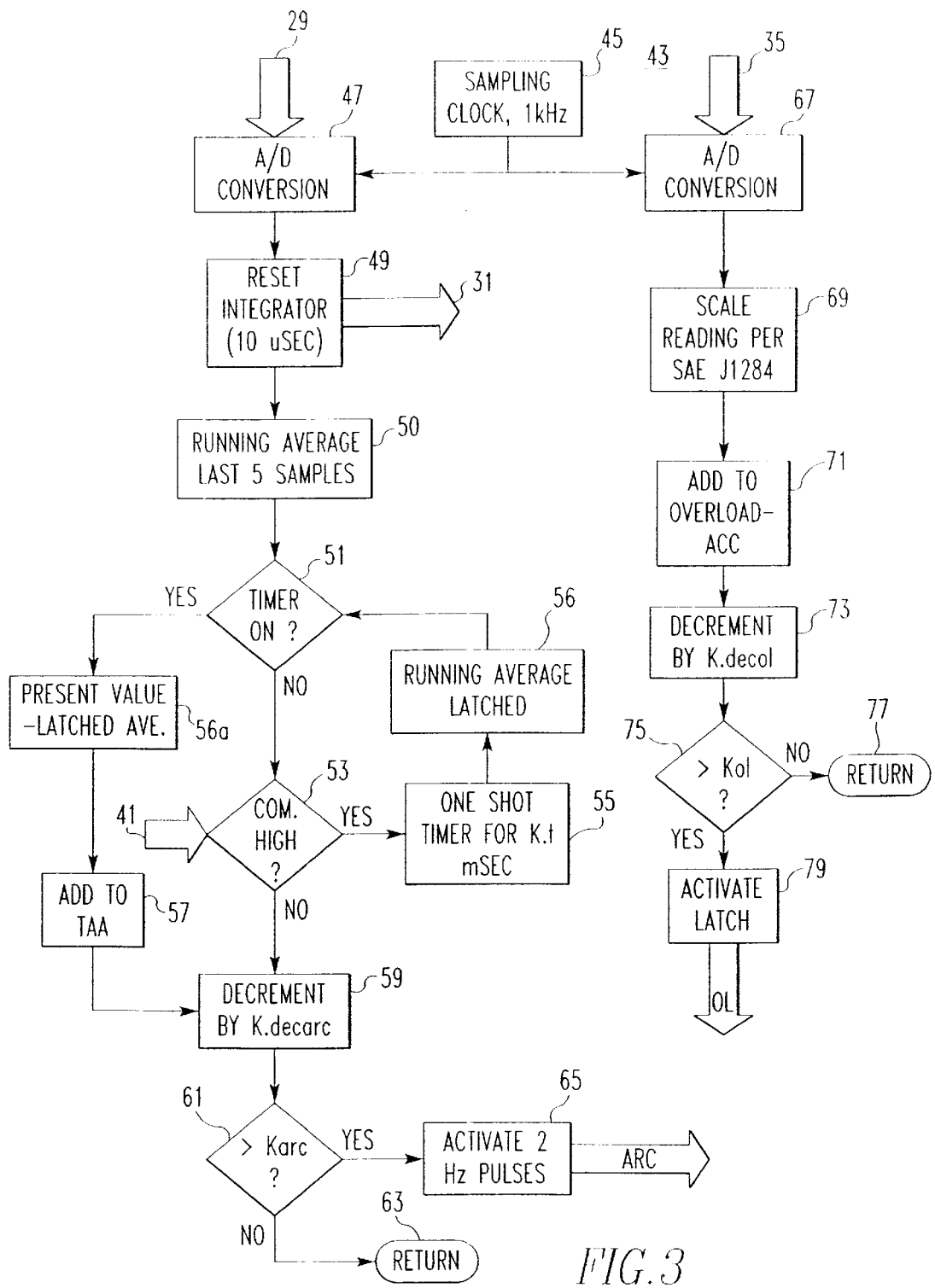
FIG. 3 illustrates a modification to a portion of the flow diagram of FIG. 2.

However, the pulse width modulated signals will contribute to the total integration when such spikes are present and the comparator enables the microcomputer. To remove the effect of the pulse width modulated signals, the microprocessor can be programmed to continuously track the average activity in the 3 KHz band (the signal 21) over a selected time, for example, the last five sampling cycles. The average activity can be a simple average or weighted average. Then, when the high speed comparator 37 enables the microcomputer 25, the average 3 KHz signal recorded at the last sample before the enable signal is generated can be subtracted from the enabled 3 KHz activity with the results used to generate the time attenuated accumulation. FIG. 3 illustrates application of this feature to the portion of the routine of FIG. 2, which generates the arcing signal. As can be seen, after the integrator is reset at 49, the running average of the last five samples is generated at 50. If the comparator goes high at 53 to initiate the one shot timer at 55, the running average it generated prior to detection of the arc is latched at 56 and is subtracted from the present value of the integrated filtered current signal at 56a with the difference added to the time attenuated accumulation at 57.

As can be appreciated, the method of detecting arcing in dc electrical systems in accordance with the invention includes sensing the dc current, such as by the sensor 13, bandpass filtering this sensed dc current signal, such as in the bandpass filter 17 and taking the absolute value of the filtered signal, such as by the absolute value of circuit 19 to generate an absolute value filter current signal which is integrated over repetitive periods of time to generate an integrated bandpass filter current signal. The method also includes generating an average sensed dc current signal and processing the integrated bandpass filter signal, the sensed dc current signal and the average sensed dc current signal to determine the presence of arcing. More particularly, the method includes analog integration of the absolute value bandpass filtered current signal and sampling that integrated signal periodically with a microprocessor which then uses the samples to generate a time attenuated accumulation which generates an output signal indicating arcing when a selected limit for the time attenuated accumulation is reached.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. Apparatus for detecting arcing in a dc electrical system having cyclic disturbances, the apparatus comprising:

a sensor sensing current in the dc electrical system and generating a sensed dc current signal;

a bandpass filter filtering the sensed dc current signal in a pass band selected for sensitivity to arcing noise in the dc electrical system to generate a filtered current signal; and processing means integrating the filtered current signal over repetitive intervals to generate integrated filtered current values, generating a time attenuated accumulation of the integrated filtered current values, and generating an output signal when the time attenuated accumulation reaches a predetermined value.

2. The apparatus of claim 1, wherein the processing means comprises a resettable analog integrator which repetitively generates the integrated filtered current values over the repetitive intervals, and digital processing means processing the integrated filtered current values to generate the time attenuated accumulation and the output signal when the time attenuated accumulation reaches the predetermined value.

3. The apparatus of claim 2, wherein the processing means further includes means generating from the sensed dc current signal an average dc current signal and the digital processing means includes overload means processing the average dc current signal and generating the output signal when the average dc current signal exceeds predetermined time/current limits.

4. The apparatus of claim 2, wherein the processing means includes enabling means enabling the digital processing means to add integrated filtered current values to the time attenuated accumulation only for predetermined time periods after the sensed dc current exceeds the average dc current in a predetermined manner.

5. The apparatus of claim 4, wherein the predetermined time periods comprise more than one repetitive interval.

6. The apparatus of claim 4, wherein the enabling means comprises a low pass filter generating the average sensed dc current signal and a comparator comparing the sensed dc current signal to the average sensed dc current signal and generating an enable signal enabling the digital processing means when the sensed dc current signal exceeds the average sensed dc current signal in a predetermined manner.

7. The apparatus of claim 6, wherein the digital processing means includes overload means processing the average sensed dc current signal and generating the output signal when the average sensed dc current signal exceeds predetermined time/current limits.

8. The apparatus of claim 7 adapted for use with a dc electrical system having a battery connected to a load and source by a battery cable wherein the sensor senses current in the battery cable.

9. The apparatus of claim 2 wherein the digital processing means includes means generating a running average of a selected number of most recent integrated filtered current values and means generating a difference between a present integrated filter current signal value and the running average, which difference is used by the means generating the time attenuated accumulation.

10. The apparatus of claim 1 adapted for use with a dc electrical system having a battery connected to a load and source by a battery cable wherein the sensor senses current in the battery cable.

11. Apparatus for detecting arcing in dc electrical systems having cyclic disturbances, the apparatus comprising:
a sensor sensing current in the dc system and generating a sensed dc current signal; and
processing means comprising:
a bandpass filter filtering the sensed dc current signal in a pass band selected for sensitivity to arcing noise in the dc electrical system to generate an absolute value filtered current signal;
a resettable analog integrator integrating the absolute value filtered current signal over repetitive intervals to generate an integrated filtered current signal; and
a digital processor taking samples of the integrated filtered current signal generated by the resettable analog integrator during the repetitive intervals, resetting the analog integrator after each sample, generating a time attenuated accumulation of the samples and generating an output signal when the time attenuated accumulation reaches a predetermined level.

12. The apparatus of claim 11, wherein the processing means further includes a low pass filter generating an average sensed dc current signal and wherein the digital processor has overload means processing the average sensed dc current signal and generating the output signal when the average sensed dc signal exceeds predetermined time/current limits.

13. The apparatus of claim 12 adapted for use with a dc electrical system having a battery and wherein the sensor is coupled to the dc electrical system adjacent the battery.

14. The apparatus of claim 13 adapted for use with a dc electrical system wherein the battery is connected a source and a load through a battery cable and wherein the sensor is coupled to the dc electrical system at the battery cable.

15. The apparatus of claim 11, wherein the bandpass filter has a predetermined center frequency and wherein the digital processor comprises a microcomputer taking samples at a rate below the center frequency of the bandpass filter.

16. The apparatus of claim 15, wherein the bandpass filter has a center frequency of about 3 KHz.

17. The apparatus of claim 16, wherein the microcomputer takes samples at a rate of about 1 KHz.

18. The apparatus of claim 15, wherein the processing means includes a low pass filter generating an average sensed dc current signal and a comparator enabling the microprocessor to take the samples of the absolute value filtered current signal only during predetermined time periods after the sensed dc current signal exceeds the average sensed dc current signal in a predetermined manner.

19. The apparatus of claim 18, wherein the digital processor includes means generating a running average of a selected number of the most recent samples and means generating a difference between the present sample and the running average generated just before the sensed dc current signal exceeds the average sensed dc current signal in the predetermined manner, which difference is used by the digital processor in generating the time attenuated accumulation.

20. The apparatus of claim 18, wherein the comparator has a frequency response at least twice that of the pass band frequency of the bandpass filter.

21. The apparatus of claim 20, wherein the bandpass filter has a center frequency of about 3 KHz and wherein the comparator has a frequency response of at least about 10 KHz.

22. The apparatus of claim 20 adapted for use with a dc electrical system having a battery and wherein the sensor is coupled to the dc electrical system adjacent the battery.

23. A method for detecting arcing in a dc electrical system having cyclic disturbances, the method comprising:
sensing current in the dc electrical system and generating a sensed dc current signal;
bandpass filtering the sensed dc current signal in a pass band selected for sensitivity to arcing noise in the dc electrical system to generate an absolute value filtered current signal;
generating an average sensed dc current signal from the sensed dc current signal;
processing the absolute value filtered current signal, the average sensed dc current signal and the sensed dc current signal to determine the presence of arcing.

24. The method of claim 23, wherein the step of processing comprises comparing the sensed dc current signal with the average sensed dc current signal and digitally processing samples of the absolute value filtered current signal taken during a predetermined time period after the sensed dc current signal exceeds the average sensed dc current signal in a predetermined manner to determine the presence of arcing.

25. The method of claim 24 wherein processing comprises generating a running average of a selected number of most recent samples of the absolute value filtered current signal, and only using a difference between the value of the present sample of the absolute value filtered current signal and the running average generated at the sample before the sensed dc current signal exceeds the average dc current signal to determine the presence of arcing.

* * * * *